US009916910B2

(12) United States Patent
Singh et al.

(10) Patent No.: US 9,916,910 B2
(45) Date of Patent: Mar. 13, 2018

(54) PASSIVELY-COOLED SPENT NUCLEAR FUEL POOL SYSTEM AND METHOD THEREFOR

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC

( * ) Notice: Subject to any disclaimer, the term of this patent is extended or adjusted under 35 U.S.C. 154(b) by 466 days.

(21) Appl. No.: 14/620,465

(22) Filed: Feb. 12, 2015

(65) Prior Publication Data

US 2015/0243385 A1 Aug. 27, 2015

Related U.S. Application Data

(63) Continuation-in-part of application No. PCT/US2013/054973, filed on Aug. 14, 2013.

(Continued)

(51) Int. Cl.
*G21C 15/18* (2006.01)
*G21C 19/07* (2006.01)
(Continued)

(52) U.S. Cl.
CPC .............. *G21C 15/18* (2013.01); *G21C 13/02* (2013.01); *G21C 19/04* (2013.01); *G21C 19/07* (2013.01); *G21C 11/00* (2013.01); *Y02E 30/40* (2013.01)

(58) Field of Classification Search
CPC ........ G21C 19/07; G21C 13/02; G21C 15/18; G21C 19/04; G21C 11/00; Y02E 30/40
(Continued)

(56) References Cited

U.S. PATENT DOCUMENTS 2,621,492 A 12/1952 Beardsley et al.
2,640,686 A 6/1953 Brown, Jr.
(Continued)

FOREIGN PATENT DOCUMENTS

CN 102568622 * 7/2012 ............ Y02E 30/40
GB 2251117 6/1992
(Continued)

OTHER PUBLICATIONS

Corresponding International Search Report and Written Opinion for PCT/US15/30969 dated Sep. 14, 2015.
(Continued)

*Primary Examiner* — Jack W Keith
*Assistant Examiner* — Daniel Wasil
(74) *Attorney, Agent, or Firm* — The Belles Group, P.C.

(57) ABSTRACT

A passively-cooled spent nuclear fuel pool system comprising: a spent nuclear fuel pool comprising a body of liquid water having a surface level, at least one spent nuclear fuel rod submerged therein that heats the water; a lid covering the spent nuclear fuel pool to create a hermetically sealed vapor space between the surface level and the lid; and a passive heat exchange sub-system including a riser conduit comprising first and second riser inlet sections and a primary riser section that receives water vapor therefrom. Each riser inlet section has a respective inlet positioned in a respective section of the vapor space. A downcomer receives and condenses water vapor from the primary section forming condensed water vapor. A return conduit fluidly coupled to the downcomer and having an outlet located in the body of liquid water returns the condensed water vapor thereto.

24 Claims, 8 Drawing Sheets

Related U.S. Application Data

(60) Provisional application No. 61/683,030, filed on Aug. 14, 2012.

(51) Int. Cl.
*G21C 19/04* (2006.01)
*G21C 13/02* (2006.01)
*G21C 11/00* (2006.01)

(58) Field of Classification Search
USPC .......................................................... 376/272
See application file for complete search history.

(56) References Cited

U.S. PATENT DOCUMENTS

| | | | |
|---|---|---|---|
| 4,404,165 | A | 9/1983 | Hesky et al. |
| 5,075,070 | A | 12/1991 | Costes |
| 5,570,401 | A | 10/1996 | Gluntz |
| 5,612,982 | A | 3/1997 | Woodcock et al. |
| 2012/0051484 | A1 | 3/2012 | Schmidt et al. |
| 2012/0106692 | A1* | 5/2012 | Keenan ............... G21C 19/07 376/203 |
| 2012/0307957 | A1* | 12/2012 | Sedlacek ............. G21C 19/32 376/313 |
| 2013/0272474 | A1 | 10/2013 | Conway et al. |

FOREIGN PATENT DOCUMENTS

| | | |
|---|---|---|
| JP | S5813159 | 1/1983 |
| JP | H02223896 | 9/1990 |
| RU | 2084025 | 7/1997 |
| RU | 2403633 | 11/2010 |
| WO | 2013096966 | 6/2013 |
| WO | 2014028634 | 2/2014 |

OTHER PUBLICATIONS

International Search Report and the Written Opinion dated Jan. 16, 2014, of corresponding PCT/US2013/54973, filed Aug. 14, 2013. WO.
Corresponding Office Action and Search Report issued by the RUPTO dated Mar. 29, 2016.

\* cited by examiner

US 9,916,910 B2

PASSIVELY-COOLED SPENT NUCLEAR FUEL POOL SYSTEM AND METHOD THEREFOR

CROSS-REFERENCE TO RELATED PATENT APPLICATIONS

The present application is a continuation-in-part of PCT/US2013/054973 filed Aug. 14, 2013, which claims the benefit of U.S. Provisional Patent Application Ser. No. 61/683,030, filed Aug. 14, 2012, the entireties of which are incorporated herein by reference.

FIELD OF THE INVENTION

The present invention relates to a passive system for cooling a spent nuclear fuel pool and a method of passively cooling a spent nuclear fuel pool.

BACKGROUND OF THE INVENTION

A spent fuel pool is a body of water inside a nuclear power plant's fuel storage building which is typically about forty feet deep and which is equipped with fuel racks to store spent nuclear fuel that is discharged from the reactor during refueling outages. The pool keeps the fuel in a safe underwater configuration absorbing the fuel's radiation and its decay heat. The decay heat deposited by the fuel into the pool's water must be removed to prevent uncontrolled heat-up of the pool's water, which would result in undesirable evaporation of the fuel pool water. In existing nuclear plant design practice, the pool's water is cooled by pumping it though a heat exchanger, which is typically served by the plant's component cooling water, a closed loop purified water stream that cools a variety of equipment in the plant and is in turn cooled by a natural source of water such as a lake, a river, or an ocean.

This conventional spent fuel pool cooling system has several drawbacks, the most notable of which is the dependence of the pool cooling on pumps and motors to circulate water through both sides of the heat exchanger. During a power outage or some other event that disables the pumps and motors, the water in the spent fuel pool will boil and evaporate which can lead to the fuel being exposed above the surface level of the pool water. Another drawback is the continuous release of water vapor inside the plant's fuel storage building which adds to the building's humidity and temperature affecting its habitability and increasing its HVAC burden. The open pool also attracts dust and particulates from the ambient air turning them into radioactive material which must be suctioned from the pool, filtered and collected for disposal as contaminated waste.

Thus, a need exists for a system and method for cooling a spent fuel pool that does not rely on pumps and motors. A need also exists for a system and method for reducing the humidity inside of a nuclear power plant fuel storage building. Furthermore, a need exists for a system and method for preventing dust and particulates from collecting in the spent fuel pool.

SUMMARY OF THE INVENTION

The present invention provides a passively-cooled spent nuclear fuel pool system and method therefor that overcomes the deficiencies of the foregoing existing arrangements.

In one aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; a lid covering the spent nuclear fuel pool to form a hermetically sealed vapor space between the surface level of the body of liquid water and the lid, the lid comprising a first lid section and a second lid section; and a first divider extending from the lid a partial distance into the body of liquid water to divide the vapor space into a first vapor space section located between the first lid section and the body of liquid water and a second vapor space section located between the second lid section and the body of liquid water; and a passive heat exchange sub-system comprising: a riser conduit comprising a first riser inlet section having a first inlet positioned within the first vapor space section, a second riser inlet section having a second inlet positioned within the second vapor space section and a primary riser section, wherein the riser conduit receives water vapor from the first and second vapor space sections; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water.

In another aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; and a lid covering the spent nuclear fuel pool to create a vapor space between the surface level of the body of liquid water and the lid; and a passive heat exchange sub-system comprising: at least one riser conduit having an inlet located within the vapor space for receiving water vapor from the vapor space; at least one downcomer conduit fluidly coupled to the riser conduit for receiving the water vapor from the riser conduit, the water vapor condensing within the downcomer conduit to form a condensed water vapor; and at least one return conduit fluidly coupled to the at least one downcomer conduit, the return conduit having an outlet located within the body of liquid water for returning the condensed water vapor to the body of liquid water.

In yet another aspect, the invention can be a passively-cooled spent nuclear fuel pool system comprising: a spent nuclear fuel pool comprising a body of liquid water having a surface level, at least one spent nuclear fuel rod submerged in the body of liquid water that heats the body of liquid water; a lid covering the spent nuclear fuel pool to create a hermetically sealed vapor space between the surface level of the body of liquid water and the lid; and a passive heat exchange sub-system fluidly coupled to the vapor space, the passive heat exchange sub-system configured to: (1) receive water vapor from the vapor space; (2) remove thermal energy from the received water vapor, thereby condensing the water vapor to form a condensed water vapor; and (3) return the condensed water vapor to the body of liquid water.

In a further aspect, the invention can be a method of passively cooling a spent nuclear fuel pool comprising: a) covering the spent nuclear fuel pool with a lid thereby forming a vapor space having water vapor between the lid and a surface level of a body of liquid water located within the spent fuel pool; b) passively flowing the water vapor from the vapor space through a heat exchange sub-system that removes thermal energy from the water vapor to form a condensed water vapor; and c) passively flowing the condensed water vapor from the heat exchange sub-system to the body of liquid water.

In a still further aspect, the invention can be a method of passively cooling a spent nuclear fuel pool comprising: a) at least partially filing the spent nuclear fuel pool with a body of liquid water having a surface level; b) submerging at least one nuclear fuel rod in the body of liquid water, the at least one nuclear fuel rod heating the body of liquid water; c) covering the body of a liquid water with a lid to form a hermetically sealed vapor space between the surface level of the body of liquid water and the lid, the lid comprising a first lid section and a second lid section; d) dividing the vapor space into a first vapor space section located between the first lid section and the body of liquid water and a second vapor space section located between the second lid section and the body of liquid water, the first and second vapor space sections being hermetically isolated from one another by a divider; e) fluidly coupling a heat exchange sub-system to the spent nuclear fuel pool, the heat exchange sub-system having a riser conduit, a downcomer conduit and a return conduit that are fluidly coupled together, the riser conduit having an inlet positioned within each of the first and second vapor space sections and the return conduit having an outlet positioned within the body of liquid water; and wherein water vapor flows from the first and second water vapor space sections to the riser conduit and from the riser conduit into the downcomer conduit, wherein the water vapor condenses within the downcomer conduit to form a condensed water vapor, and wherein the condensed water vapor flows from the downcomer conduit and into the return conduit and from the return conduit into the body of liquid water.

BRIEF DESCRIPTION OF THE DRAWINGS

The features of the exemplary embodiments of the present invention will be described with reference to the following drawings, where like elements are labeled similarly, and in which.

Figure 1:
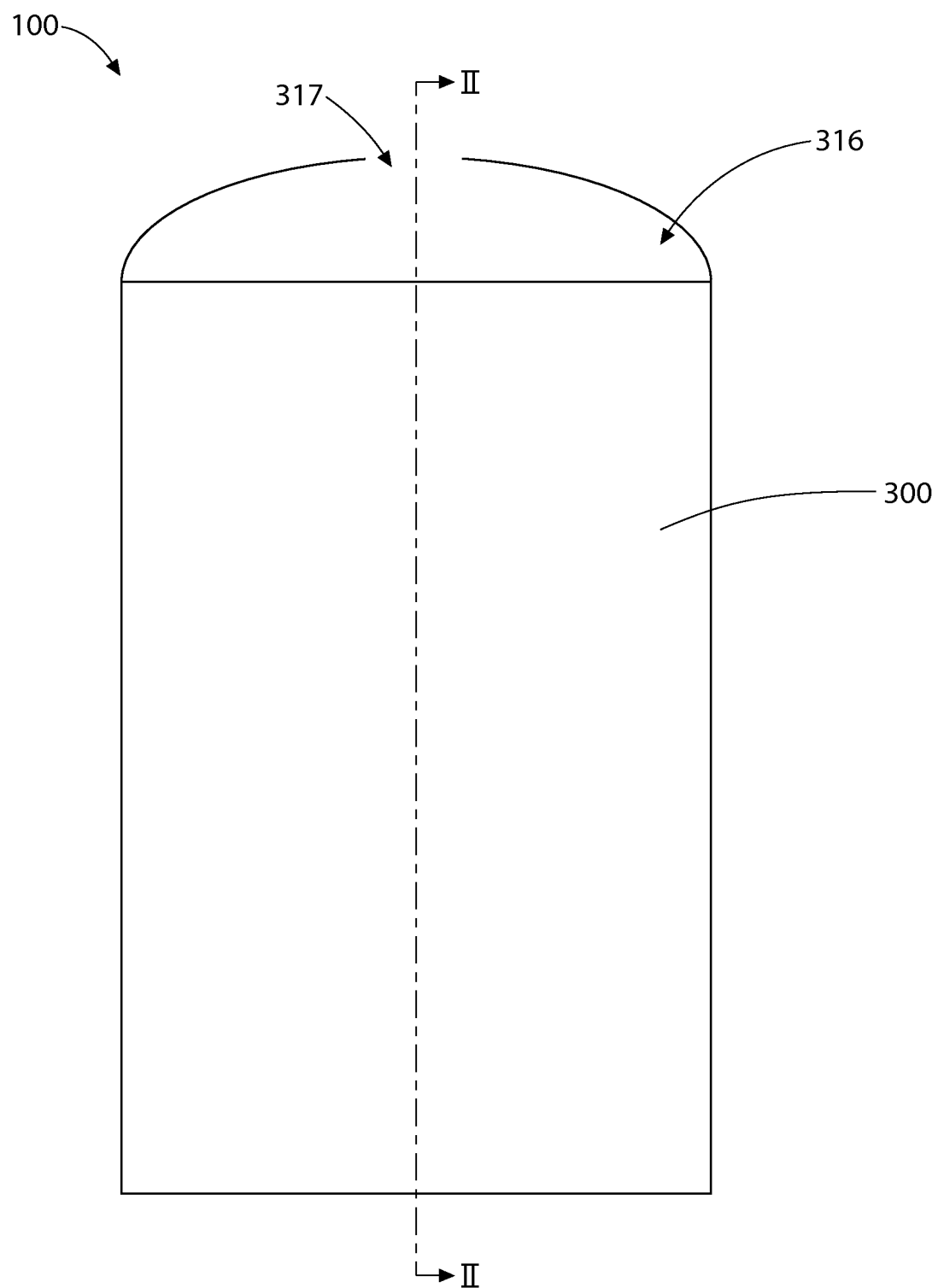
FIG. 1 is a front view of a containment enclosure for a nuclear reactor in accordance with an embodiment of the present invention.

All drawings are schematic and not necessarily to scale.

DETAILED DESCRIPTION OF THE INVENTION

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Figure 2:
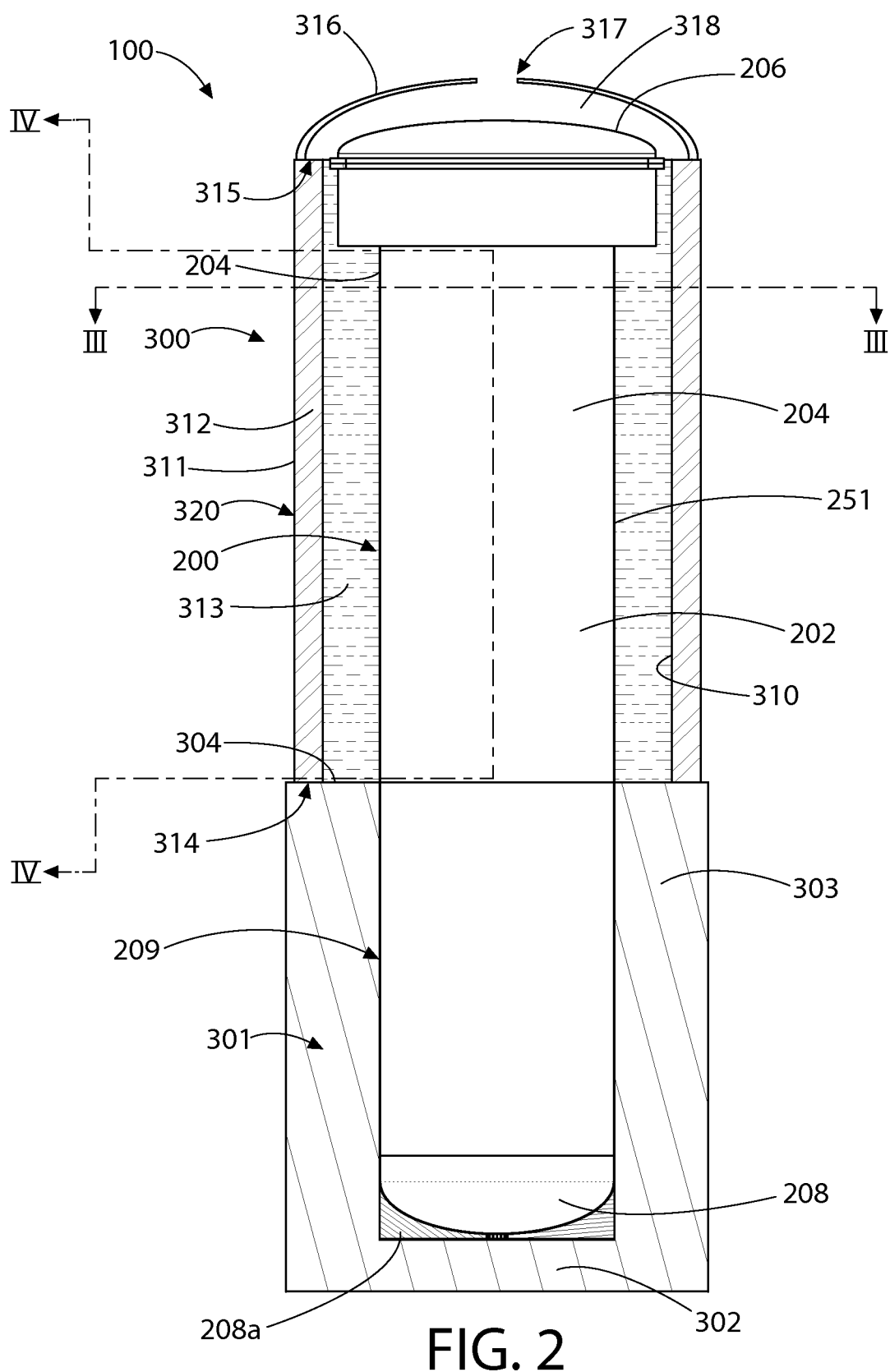
FIG. 2 is a cross-sectional view through the containment enclosure taken along line II-II of FIG. 1 illustrating a containment vessel at least partially surrounded by the containment enclosure.

Referring first to FIGS. 1 and 2 concurrently, a nuclear reactor containment system 100 is illustrated in accordance with an embodiment of the present invention. The system 100 generally includes an inner containment structure such as a containment vessel 200 and an outer containment enclosure 300. The containment vessel 200 and the containment enclosure 300 are vertically elongated structures that house certain components of a nuclear power plant such as a nuclear reactor and a spent nuclear fuel pool. The containment vessel 200 and the containment enclosure 300 collectively form a containment vessel-enclosure assembly 200-300. In certain embodiments, the containment enclosure 300 and the containment vessel 200 may be partially buried in the subgrade. The details of the containment vessel 200 and the containment enclosure 300 are described in detail below and in International Application No. PCT/US13/42070, filed on May 21, 2013, the entirety of which is incorporated herein by reference.

In certain embodiments, the containment vessel-enclosure assembly 200-300 may be supported by a concrete foundation 301 comprised of a bottom slab 302 and vertically extending sidewalls 303 rising from the bottom slab 302 and forming a top base mat 304. The sidewalls 303 may circumferentially enclose a lower portion 209 of the containment vessel 200 as shown in FIG. 2 wherein the lower portion 209 of the containment vessel 200 is positioned inside the sidewalls 303. In some embodiments, the sidewalls 303 may be poured after placement of the containment vessel 200 on the bottom slab 302 (which may be poured and set first) thereby completely embedding the lower portion 209 of the containment vessel 200 within the foundation 301. The foundation sidewalls 303 may terminate below grade in some embodiments to provide additional protection for the containment vessel-enclosure assembly 200-300 from projectile impacts (e.g. crashing plane, etc.). The foundation 301 may have any suitable configuration in a top plan view, including without limitation polygonal (e.g. rectangular, hexagon, circular, etc.).

The containment enclosure 300 may be a double-walled structure in some embodiments having sidewalls 320 formed by two substantially radially spaced and interconnected concentric shells 310 (inner) and 311 (outer) with plain or reinforced concrete 312 installed in the annular space between the inner and outer shells 310, 311. In such embodiments, the inner and outer shells 310, 311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure 300 may have a concrete 312 thickness of six feet or more which ensures adequate ability to withstand high energy projectile impacts such as that from an airliner.

The containment enclosure 300 circumscribes the containment vessel 200 and is spaced substantially radially apart from the containment vessel 200, thereby creating a heat sink space 313 between an outer surface 251 of the containment vessel 200 and the inner shell 310 of the containment enclosure 300. The heat sink space 313 may be a liquid reservoir in one embodiment such that the heat sink space 313 is filled with a liquid such as water to create a heat sink for receiving and dissipating heat from the containment vessel 200 in the case of a thermal energy release incident inside the containment vessel 200. The heat sink can also be used to remove thermal energy from a spent nuclear fuel pool located within the containment vessel 200 as discussed in more detail below with reference to FIGS. 7 and 9. This water-filled heat sink space 313 extends circumferentially for a full 360 degrees in one embodiment such that the heat sink space 313 is an annular space circumferentially surrounding the containment vessel 200. In one embodiment, the heat sink space 313 is filled with liquid from the base mat 304 at the bottom end 314 of the concentric shells 310, 311 of the containment enclosure 300 to approximately the top end 315 of the concentric shells 310, 311 of the containment enclosure 300 to form an annular cooling water reservoir between the containment vessel 200 and the inner shell 310 of the containment enclosure 300. This annular reservoir may be coated or lined in some embodiments with a suitable corrosion resistant material such as aluminum, stainless steel, or a suitable preservative for corrosion protection. In one representative example, without limitation, the heat sink space 313 may be about 10 feet wide and about 100 feet high.

In one embodiment, the containment enclosure 300 includes a steel dome 316 that is suitably thick and reinforced to harden it against crashing aircraft and other incident projectiles. The dome 316 may be removably fastened to the shells 310, 311 by a robust flanged joint. In one embodiment, the containment vessel 200 is entirely surrounded on all exposed above grade portions by the containment enclosure 300, which preferably is sufficiently tall to provide protection for the containment vessel 200 against aircraft hazard or comparable projectile to preserve the structural integrity of the water mass in the heat sink space 313 surrounding the containment vessel 200. In one embodiment, the containment enclosure 300 extends vertically below grade to the top base mat 304.

The containment enclosure 300 may further include at least one rain-protected vent 317 which is in fluid communication with the heat sink space 313 and a head space 318 located between the dome 316 and the containment vessel 200 to allow water vapor to flow, escape, and vent to the atmosphere. Thus, in certain embodiments due to the vent 317 the containment enclosure 300 may be considered to have an open top end. In one embodiment, the vent 317 may be located at the center of the dome 316, although the invention is not to be so limited and the vent 317 can be otherwise located. In other embodiments, a plurality of vents may be provided spaced substantially radially around the dome 316. The vent 317 may be formed by a short section of piping in some embodiments which is covered by a rain hood of any suitable configuration that allows steam to escape from the containment enclosure 300 but minimizes the ingress of water.

In some embodiments, the head space 318 between the dome 316 and the containment vessel 200 may be filled with an energy absorbing material or structure to minimize the impact load on the dome 316 of the containment enclosure 300 from a crashing or falling projectile such as, for example without limitation, an airliner, a meteor or the like. In one example, a plurality of tightly-packed undulating or corrugated deformable aluminum plates may be disposed in part or all of the head space 318 to form a crumple zone which will help absorb and dissipate the impact forces on the dome 316.

In the exemplified embodiment, the containment structure 200 is an elongated vessel 202 including a hollow cylindrical shell 204 having a circular transverse cross-section, a top head 206, and a bottom head 208. In certain embodiments the containment vessel 200 may be considered a thermally conductive containment vessel in that the containment vessel 200 is formed of a thermally conductive material (i.e., metal or the like as discussed below) and can be used to transfer heat from the interior of the containment vessel 200 to the heat sink space 313. In one embodiment, the containment vessel 200 may be made from a suitably strong and ductile metallic plate and bar stock that is readily weldable, such as, for example without limitation, a low carbon steel. In one embodiment, the cylindrical shell 204 of the containment vessel 200 may be formed of a low carbon steel having a thickness of at least one inch. Other suitable metallic materials that can be used for the containment vessel 200 include without limitation various metallic alloys and the like.

In one embodiment, the weight of the containment vessel 200 may be primarily supported by the bottom slab 302 on which the containment vessel 200 rests and the containment enclosure 300 may be supported by the base mat 304 formed atop the sidewalls 303 of the foundation 301. Other suitable containment vessel 200 and containment enclosure 300 support arrangements may be used. In one embodiment, the bottom of the containment vessel 200 may include a ribbed support stand 208a or similar structure attached to the bottom head 208 to help stabilize and provide level support for the containment vessel on the slab 302 of the foundation 301.

Figure 3:
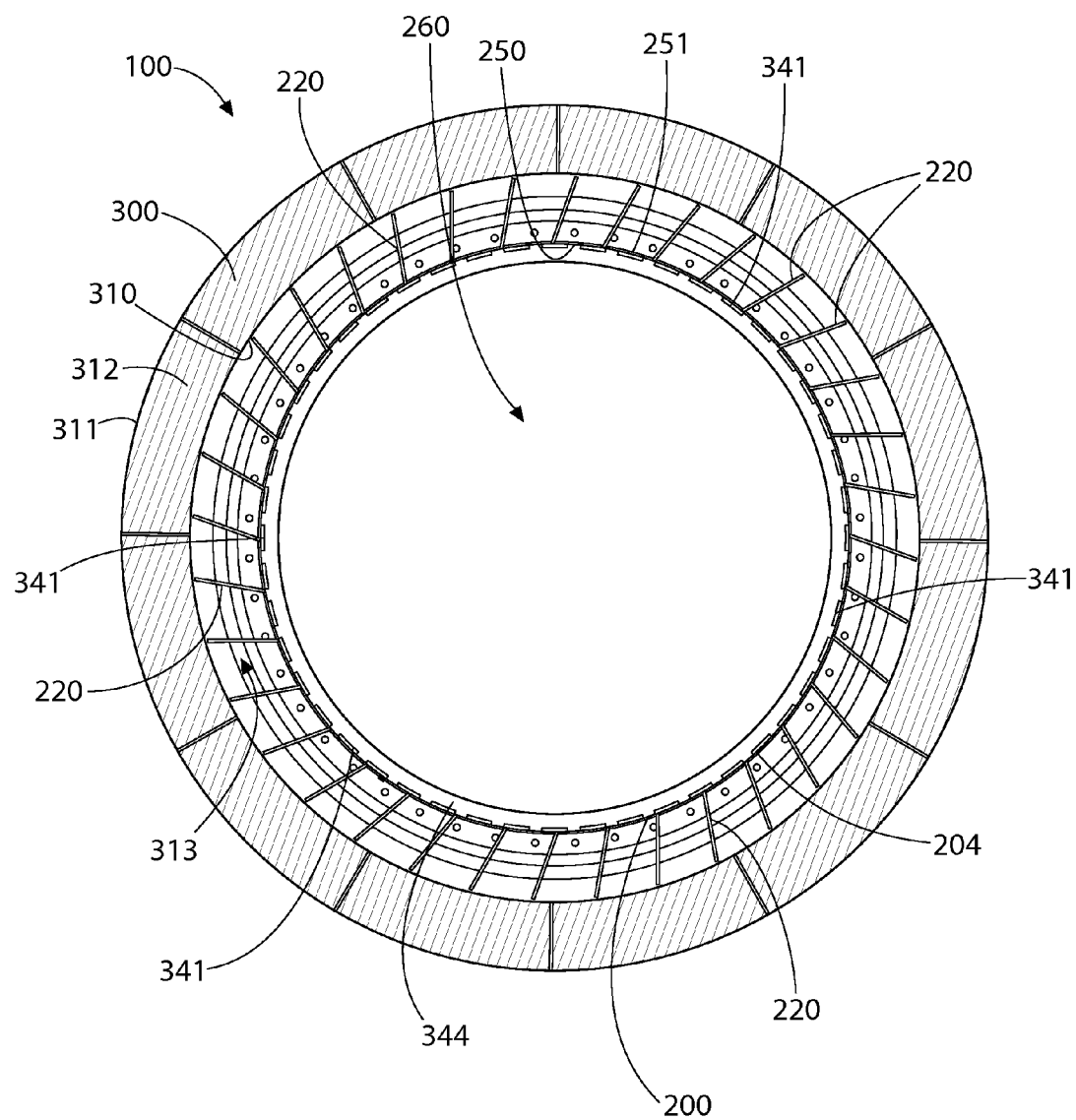
FIG. 3 is a cross-sectional view taken along line III-III of FIG. 2.
Figure 4:
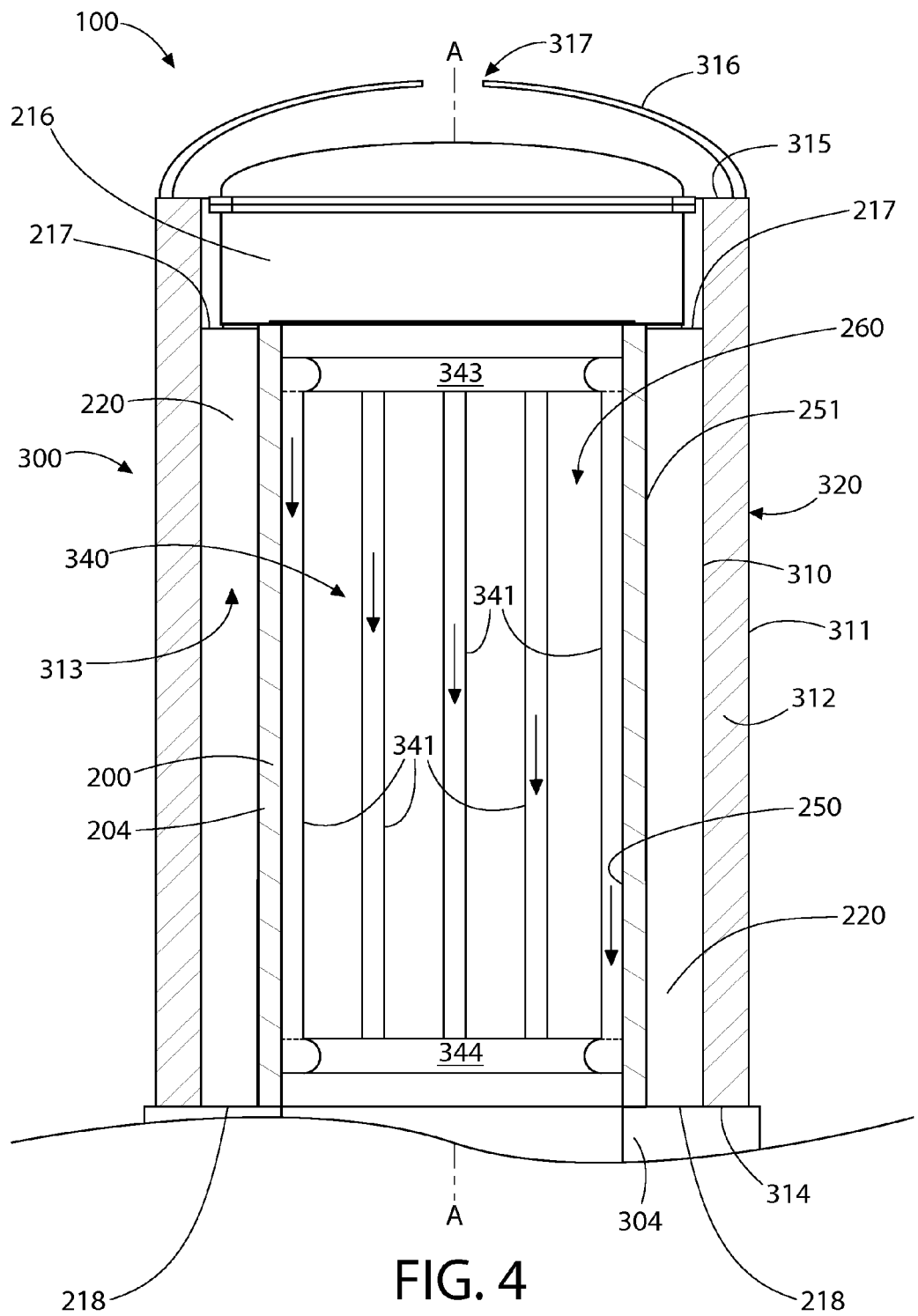
FIG. 4 is a cross-sectional view taken along line IV-IV of FIG. 2.

Referring now to FIGS. 3 and 4 concurrently, the invention will be further described. FIG. 3 illustrates a top cross-sectional view of the containment enclosure 300 and the containment vessel 200 and the heat sink space 313 therebetween and FIG. 4 illustrates a longitudinal cross-sectional view thereof. As noted above, the containment vessel 200 has an inner surface 250 and an outer surface 251, the inner surface 250 defining an interior cavity 260 of the containment vessel 200. In the exemplified embodiment, the containment vessel 200 has a plurality of heat exchange fins 220 extending from the outer surface 251 of the containment vessel 200 and into the liquid reservoir in the heat sink space 313. However, the invention is not to be so limited in all embodiments and in certain other embodiments the heat exchange fins 220 may be omitted. In the exemplified embodiment, the heat exchange fins 220 are spaced circumferentially around the perimeter of the shell 204 of the containment vessel 200 and extend substantially radially outwards from the containment vessel 200 into the heat sink space 313.

Referring solely to FIG. 3, the heat exchange fins 220 will be further described. The heat exchange fins 220, when used, serve multiple advantageous functions including without limitation: (1) stiffening the containment vessel 200; (2) preventing excessive "sloshing" of water in heat sink space 313 in the occurrence of a seismic event; and (3) acting as heat transfer "fins" to dissipate heat absorbed by conduction through the containment vessel 200 to the environment of the heat sink space 313.

Accordingly, in one embodiment to maximize the heat transfer effectiveness, the heat exchange fins 220 extend vertically for substantially the entire height of the heat sink space 313 covering the effective heat transfer surfaces of the containment vessel 200 (i.e. portions not buried in concrete foundation) to transfer heat from the containment vessel 200 to the liquid reservoir in the heat sink space 313. In one embodiment, the heat exchange fins 220 have upper horizontal ends 217 which terminate at or proximate to the underside or bottom of a top portion 216 of the containment vessel 200, and lower horizontal ends 218 which terminate at or proximate to the base mat 304 of the concrete foundation 301. In one embodiment, the heat exchange fins 220 may have a height which is equal to or greater than one half of a total height of the shell 204 of the containment vessel 200.

The heat exchange fins 220 may be made of steel (e.g. low carbon steel) or other suitable metallic materials including alloys which are each welded on one of the longitudinally-extending sides to the outer surface 251 of the containment vessel 200. The opposing longitudinally-extending side of each heat exchange fin 220 lies proximate to, but is not permanently affixed to the interior of the inner shell 310 of the containment enclosure 300 to maximize the heat transfer surface of the ribs acting as heat dissipation fins. Thus, the non-welded side of the heat exchange fins 220 is spaced from the inner shell 310 of the containment enclosure 300 by a small gap. In one embodiment, the heat exchange fins 220 extend substantially radially outwards beyond the top portion 216 of the containment vessel 200. In one representative example, without limitation, steel heat exchange fins 220 may have a thickness of about one inch. Other suitable thickness of fins may be used as appropriate. Accordingly, in some embodiments, the heat exchange fins 220 have a radial width that is more than 10 times the thickness of the heat exchange fins 220.

In one embodiment, the heat exchange fins 220 are oriented at an oblique angle to the containment vessel 200. This orientation forms a crumple zone extending 360 degrees around the circumference of the containment vessel 200 to better resist projectile impacts functioning in cooperation with the outer containment enclosure 300. Accordingly, an impact causing inward deformation of the inner and outer shells 310, 311 of the containment enclosure 300 will bend the heat exchange fins 220, which in the process will distribute the impact forces without direct transfer to and rupturing of the inner containment vessel 200 as might possibly occur with fins oriented 90 degrees to the containment vessel 200. In other possible embodiments, depending on the construction of the containment enclosure 300 and other factors, a perpendicular arrangement of the heat exchange fins 220 to the containment vessel 200 may be appropriate.

Referring to FIGS. 3-6 concurrently, the invention will be further described. The invention includes a passive heat exchange sub-system 340 that is fluidly coupled to a spent nuclear fuel pool 600 (see FIGS. 7 and 9, discussed in more detail below) that is housed within and enclosed by the containment vessel 200. The details of the operation of the passive heat exchange sub-system 340 will be discussed in more detail below with reference to FIGS. 7 and 9.

In the exemplified embodiment, the passive heat exchange sub-system 340 comprises, in part, at least one downcomer conduit 341, an inlet manifold 343 and an outlet manifold 344. In certain embodiments the inlet manifold 343 and the outlet manifold 344 may be omitted. In the exemplified embodiment, a plurality of the downcomer conduits 341 are illustrated being in intimate surface contact and therefore directly coupled to the inner surface 250 of the containment vessel 200. Furthermore, in certain embodiments the inlet and outlet manifolds 343, 344 may also be in intimate surface contact and directly coupled to the inner surface 250 of the containment vessel 200.

Figure 5:
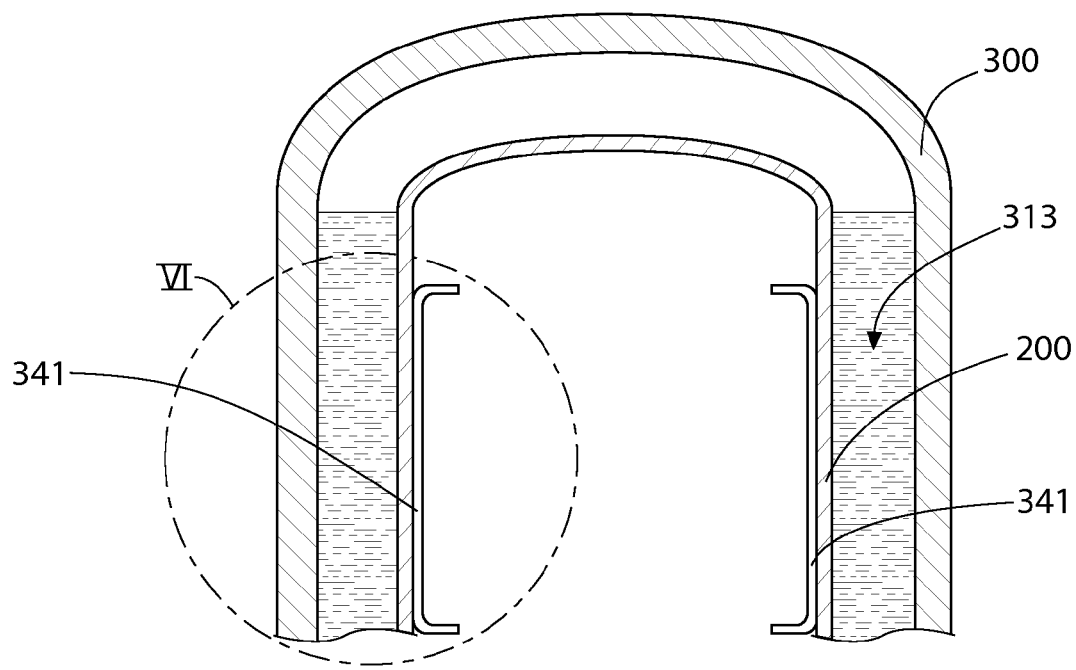
FIG. 5 is a schematic cross-sectional view through the containment enclosure and the containment vessel.
Figure 6:
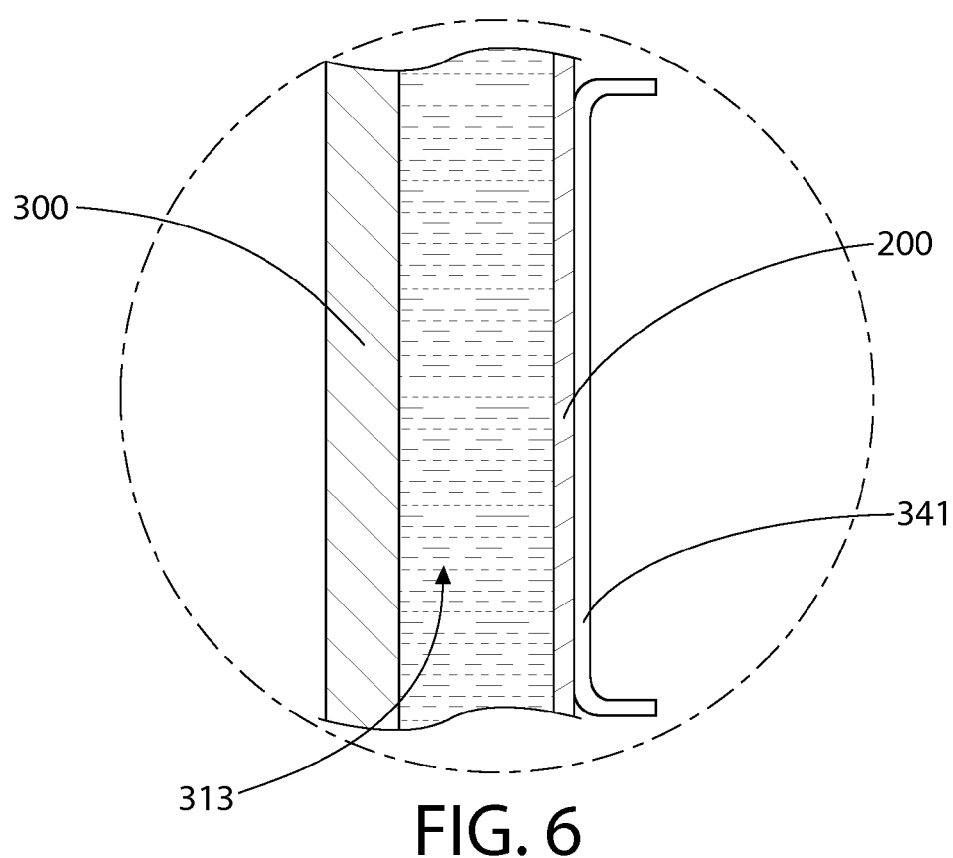
FIG. 6 is a close-up view of area VI of FIG. 5.

The downcomer conduits 341 may in certain embodiments be made of metal such as steel and be welded to the inner surface 250 of the containment vessel 200. In the exemplified embodiment, the plurality of downcomer conduits 341 are circumferentially spaced around the circumference of the containment vessel 200 and extend parallel to a longitudinal axis A-A of the containment vessel 200. As illustrated in FIGS. 5 and 6, in one embodiment the downcomer conduits 341 may be comprised of vertically oriented C-shaped structural channels (in cross section) positioned so that the parallel legs of the channels are each seam welded to the containment vessel 200 for their entire height to define a sealed vertical flow conduit. Other suitably shaped and configured downcomer conduits may be provided so long as the fluid conveyed in the downcomer conduits is in thermal cooperation with the heat sink space 313 to transfer heat to the heat sink space 313 as discussed in more detail below.

Although illustrated and described whereby the downcomer conduits 341 are coupled directly to the inner surface 250 of the containment vessel 200, the invention is not to be so limited in all embodiments. In certain embodiments the downcomer conduits 341 may be formed, partially or entirely, directly into the containment vessel 200 in between the inner and outer surfaces 250, 251 of the containment vessel 200. In such embodiments, the containment vessel 200 may have a thickness that is sufficient to support the downcomer conduits 341 between the inner and outer surfaces 250, 251 thereof. Thus, the downcomer conduits 341 may be ducts or passageways that extend vertically through the body of the containment vessel 200 in between the inner and outer surfaces 250, 251 thereof.

In the exemplified embodiment, each of the downcomer conduits 341 is fluidly coupled to both the inlet manifold 343 and the outlet manifold 344 and extends between the inlet manifold 343 and the outlet manifold 344. In the exemplified embodiment, each of the inlet and outlet manifolds 343, 344 is an annular structure that is fluidly connected to each of the downcomer conduits 341. In the exemplified embodiment, the inlet and outlet manifolds 343, 344 are vertically spaced apart and positioned at suitable elevations on the inner surface 250 of the containment vessel 200 to maximize the transfer of heat between fluid flowing vertically inside the downcomer conduits 341 and the containment vessel 200 in the active heat transfer zone defined by portions of the containment vessel 200 having the external longitudinal fins 220 and/or surrounded by the heat sink space 313. To take advantage of the liquid reservoir in the heat sink space 313 for heat transfer, the inlet and outlet manifolds 343, 344 may each respectively be located on the inner surface 250 of the containment vessel 200 adjacent and near to the top and bottom of the heat sink space 313.

In one embodiment, the inlet and outlet manifolds 343, 344 may each be formed of half-sections of steel pipe which are welded directly to the inner surface 250 of the containment vessel 200. In other embodiments, the inlet and outlet manifolds 343, 344 may be formed of complete sections of arcuately curved piping supported by and attached to the inner surface 250 of the containment vessel 200 by any suitable means. In still other embodiments, the inlet and outlet manifolds 343, 344 may be formed directly into the containment vessel 200 in the space between the inner and outer surfaces 250, 251 of the containment vessel 200. In further embodiments, the inlet and outlet manifolds 343, 344 may be directly coupled to the downcomers 341 but may be spaced from the inner surface 250 of the containment vessel 200.

In certain embodiments, some of the downcomer conduits 341 may be connected to the inlet and outlet manifolds 343, 344 while others of the downcomer conduits 341 may not be connected to the inlet and outlet manifolds 343, 344 so that various downcomer conduits 341 can play different roles in the passive cooling of the interior of the containment vessel 200. Due to the coupling of the downcomer conduits 341 to the inlet and outlet manifolds 343, 344 in the exemplified embodiment, any air, liquid or fluid that enters into the inlet manifold 343 (as discussed in detail below with reference to FIGS. 7 and 9) will flow downwardly through the downcomer conduits 341, and heat will be transferred from the air, liquid or fluid flowing through the downcomer conduits 341 into the heat sink space 313 to thereby cool the air, liquid or fluid flowing through the downcomer conduits 341. Thus, the downward pointing arrows in each of the downcomer conduits 341 depicted in FIG. 4 illustrate the direction of flow of air, liquid or fluid that flows through the downcomer conduits 341 during passive spent nuclear fuel pool cooling operations, as discussed in more detail below with reference to FIGS. 7 and 9.

Any suitable number and arrangement of downcomer conduits 341 may be provided depending on the heat transfer surface area required for cooling the fluid flowing through the downcomer conduits 341. The downcomer conduits 341 may be uniformly or non-uniformly spaced on the inner surface 250 of the containment vessel 200, and in some embodiments grouped clusters of downcomer conduits 341 may be circumferentially distributed around the containment vessel 200. The downcomer conduits 341 may have any suitable cross-sectional dimensions depending on the flow rate of fluid carried by the ducts and heat transfer considerations.

Figure 7:
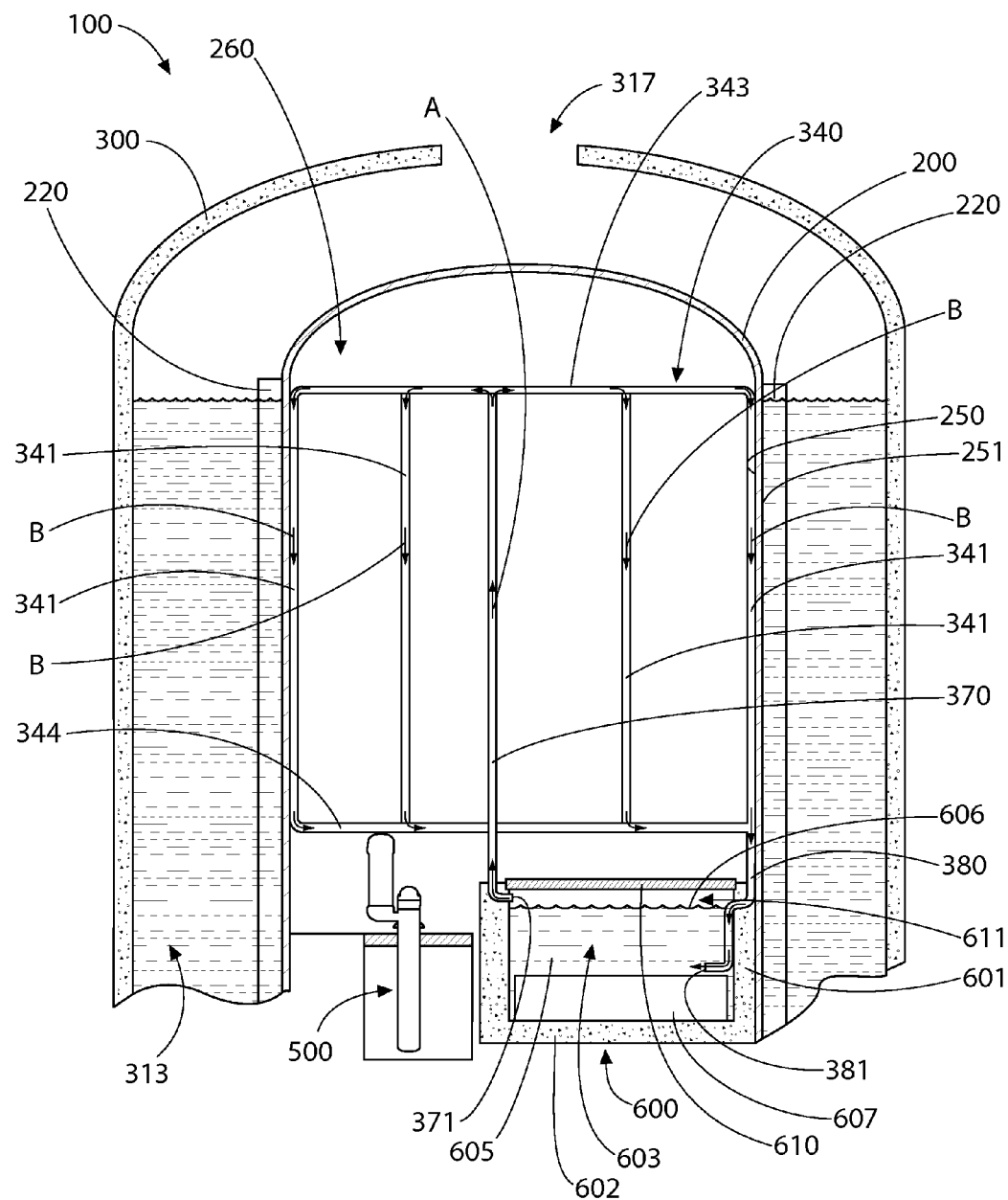
FIG. 7 is a schematic view of a generalized cross-section of a portion of the nuclear reactor containment enclosure and the containment vessel of FIG. 2 depicting a spent nuclear fuel pool and a nuclear reactor therein.

Referring now to FIG. 7, one embodiment of the interior of the containment enclosure 300 and the containment vessel 200 will be described. The containment vessel 200 encloses and houses a nuclear reactor 500 and a spent nuclear fuel pool 600. The passive heat exchange sub-system 340 is coupled to the inner surface 250 of the containment vessel 200 in the manner described above, although certain conduits of the passive heat exchange sub-system 340 can be formed directly into the containment vessel 200 as discussed above. The passive heat exchange sub-system 340 is also fluidly coupled to the spent nuclear fuel pool 600 to passively cool the spent nuclear fuel pool 600 as discussed in detail below.

The spent nuclear fuel pool 600 comprises a peripheral sidewall 601 and a floor 602 that collectively define an interior cavity 603. In the exemplified embodiment, the peripheral sidewall 601 and the floor 602 of the spent nuclear fuel pool 600 are formed of concrete, although other materials commonly used for spent nuclear fuel pool construction can be used in other embodiments. A body of liquid water 605 having a surface level 606 is positioned within the spent nuclear fuel pool 600, and more specifically the body of liquid water 605 fills the interior cavity 603 of the spent nuclear fuel pool 600. Furthermore, at last one spent nuclear fuel rod 607 is submerged in the body of liquid water 605. The at least one spent nuclear fuel rod 607 has a high heat and therefore heats the body of liquid water 605 within the spent nuclear fuel pool 600. The passive heat exchange sub-system 340 is used to passively cool the body of liquid water 605 within the spent nuclear fuel pool 600 to prevent the body of liquid water 605 from boiling and evaporating, which would result in an undesirable situation whereby the spent nuclear fuel rod(s) 607 are exposed above the surface level 606 of the body of liquid water 605.

In the exemplified embodiment, the spent nuclear fuel pool 600 is covered with a lid 610. Covering the spent nuclear fuel pool 600 with the lid 610 forms a hermetically sealed vapor space 611 between the surface level 606 of the body of liquid water 605 and the lid 610. The vapor space 611 is an air-filled space between the surface level 606 of the body of liquid water 605 and the lid 610. The vapor space 611 becomes filled with vapor or evaporated water from the body of liquid water 605 as the body of liquid water 605 becomes heated by the spent nuclear fuel rod(s) 607 submerged therein. The use of the lid 610 prevents the deposition of dirt and debris into the body of liquid water 605 thereby reducing the need for or frequency of using a pool clean-up system. Furthermore, the lid 610 prevents humidity from the spent nuclear fuel pool 600 (i.e., the water vapor in the vapor space 611) from entering into the interior cavity 260 of the containment vessel 200 and thereby reduces the HVAC burden in the interior cavity 260 of the containment vessel 200 and increases habitability of the interior cavity 260 of the containment vessel 200 by operators/workers. Furthermore, in certain embodiments the lid 610 can be designed having a flat top to enable the lid 610 to serve as a working area or equipment lay down area inside of the containment vessel 200.

The lid 610 can be formed of any desired material, including without limitation concrete, metal, metallic alloys, wood or the like. The lid 610 need not shield radiation in all embodiments because radiation shielding, to the extent that such is necessary, is generally achieved by the body of liquid water 605. Rather, the lid 610 is intended to create the hermetically sealed vapor space 611 between the lid 610 and the surface level 606 of the body of liquid water 605. Any material capable of achieving such a hermetically sealed vapor space 611 can be used for the lid 610.

As noted above, the passive heat exchange sub-system 340 is fluidly coupled to the spent nuclear fuel pool 600. More specifically, the passive heat exchange sub-system 340 is fluidly coupled to both the vapor space 611 and to the body of liquid water 605 of the spent nuclear fuel pool 600. As noted above, the passive heat exchange sub-system 340 comprises the downcomer conduits 341, the inlet manifold 343 and the outlet manifold 344. Furthermore, the passive heat exchange sub-system 340, in the exemplified embodiment, also includes a riser conduit 370 and a return conduit 380. As will be discussed in detail below, the passive heat exchange sub-system 340 is configured to receive water vapor from the vapor space 611, remove thermal energy from the received water vapor, thereby condensing the water vapor, and return the condensed water vapor to the body of liquid water 605. As a result, the water vapor does not affect the humidity inside of the interior cavity 260 of the containment vessel 200 because it remains trapped in the hermetically sealed vapor space 611 and then flows through the passive heat exchange sub-system 340 without entering into the interior cavity 260 of the containment vessel 200. Furthermore, due to the flow of the water vapor and condensed water vapor through the passive heat exchange sub-system 340, the spent nuclear fuel pool 600, and specifically the body of liquid water 605 therein, is passively cooled.

As will be discussed in more detail below, the passive heat exchange sub-system 340 comprises or forms a closed-loop fluid flow circuit. Specifically, water vapor flows from the spent nuclear fuel pool 700 (specifically from the vapor space 611 of the spent nuclear fuel pool 700) into the riser conduit 370, from the riser conduit 370 into the inlet manifold 343, from the inlet manifold into the downcomers 341, from the downcomers 341 into the outlet manifold 344, from the outlet manifold into the return conduit 380, and from the return conduit 380 back into the spent nuclear fuel pool 700 (specifically into the body of liquid water 705 within the spent nuclear fuel pool 700). Thus, the passive heat exchange sub-system 340 forms a closed-loop fluid flow circuit that takes heated vapor water from the spent nuclear fuel pool 700, cools the heated vapor water to form a cooled condensed water vapor, and reintroduces the cooled condensed water vapor back into the spent nuclear fuel pool 700 to passively cool the body of liquid water 700 within the spent nuclear fuel pool 700. The details of this system and the fluid flow through the system will be discussed in detail below.

In the exemplified embodiment, the riser conduit 370 of the passive heat exchange sub-system 340 has an inlet 371 that is located within the vapor space 611. Furthermore, the return conduit 380 of the passive heat exchange sub-system 340 has an outlet 381 that is located within the body of liquid water 605. Thus, as the body of liquid water 605 becomes heated by the spent fuel rods 607, the vapor space 611 becomes filled with hot vapor water. The vapor water will flow into the passive heat exchange sub-system 340 through the inlet 371 of the riser conduit 370. The vapor water will then flow upwards within the riser conduit 370 in the direction indicated by the arrow A.

Although the downcomer conduits 341 have been described above as being coupled to or in intimate surface contact (i.e., conformal surface contact) with the inner surface 250 of the containment vessel 200, in certain embodiments the riser conduit 370 is not similarly coupled to the containment vessel 200. Rather, it is desirable to ensure that the water vapor that flows through the riser conduit 370 retains its thermal energy while within the riser conduit 370 so that the water vapor does not cool as it rises within the riser conduit 370. By retaining the thermal energy of the water vapor while the water vapor flows through the riser conduit 370, thermosiphon flow can be facilitated by ensuring that the hot water vapor rises within the riser conduit 370 and then cools within the downcomer conduits 341. Thus, in certain embodiments the riser conduit 370 is spaced from the inner surface 250 and other surfaces of the containment vessel 200 so that the riser conduit 370 is not in thermal cooperation with the heat sink (i.e., the heat sink space 313). In certain embodiments, the riser conduit 370 may also include a thermal insulating layer. Such a thermal insulating layer will further ensure that the vapor water does not condense as it flows upwardly within the riser conduit 370 by trapping the thermal energy of the water vapor within the riser conduit 370 as the water vapor flows upwardly within the riser conduit 370.

However, the invention is not to be limited by the above in all embodiments and in certain other embodiments it may be desirable to condense the water vapor as the water vapor rises within the riser conduit 370. In such embodiments the riser conduit 370 may be coupled to or in intimate surface contact with the inner surface 250 of the containment vessel 200. Alternatively, the thermal insulating layer may be omitted and the water vapor may condense as it rises due to natural thermal energy transfer and natural cooling that occurs over time due to the temperature in the interior cavity 260 of the containment vessel 200 being less than the temperature of the water vapor within the riser conduit 370.

The vapor water will continue to flow within the riser conduit 370 in the direction of the arrow A until it is fed into the inlet manifold 343. In the exemplified embodiment, the inlet manifold 343 fluidly couples the riser conduit 370 to the one or more downcomer conduits 341. Thus, after entering into the inlet manifold 343, the vapor water will flow out of the inlet manifold 343 and into the one or more downcomer conduits 341. As noted above, the downcomer conduits 341 in certain embodiments are coupled directly to the inner surface 250 of the containment vessel 200. As a result, the downcomer conduits 341 are in thermal cooperation with the heat sink created by the liquid reservoir in the heat sink space 313. Due to this thermal cooperation between the downcomer conduits 341 and the heat sink, thermal energy is transferred from the water vapor carried within the downcomer conduits 341 outwardly to the heat sink (i.e., to the liquid reservoir in the heat sink space 313). Specifically, the thermal energy from the water vapor is transferred to the heat sink through the one or more downcomer conduits 341 and through the containment vessel 200. Thus, the heat sink space 313 and the liquid reservoir therein serves as the heat sink for the decay heat in the spent nuclear fuel pool 6000 by rejecting the heat from the water vapor that flows within the downcomer conduits 341 to the environment by natural evaporation. As the thermal energy is transferred from the water vapor to the heat sink, the water vapor condenses in the downcomer conduits 341, cools, and forms a condensed water vapor.

The thermal energy transfer from the vapor water to the heat sink facilitates the natural, passive thermosiphon flow of the water vapor through the passive heat exchange sub-system 340. Specifically, the hot water vapor rises within the riser conduit 370 and cools within the downcomer conduits 341. The hot water vapor will continually flow through the riser conduits 370 and continue to passively push the water vapor through the closed-loop fluid circuit of the passive heat exchange sub-system 340.

After the water vapor condenses within the downcomer conduits 341 to form condensed water vapor (i.e., liquid water), the condensed water vapor continues to flow downwardly within the downcomer conduits 341 in the direction of the arrows B. In some embodiments, this downward flow of the condensed water vapor can be achieved by gravity action. The condensed water vapor flows from the downcomer conduits 341 and into the outlet manifold 343. The outlet manifold 344 fluidly couples the downcomer conduits 341 to the return conduit 380. Thus, from the outlet manifold 343 the condensed water vapor flows into the return conduit 380, through the return conduit 380, and out through the outlet 381 of the return conduit 380 into the body of liquid water 605. The condensed water vapor mixes with the body of liquid water 605 in the spent nuclear fuel pool 600.

In some embodiments, the condensed water vapor has a temperature that is lower than the average temperature of the body of liquid water 605 within the spent nuclear fuel pool 600 due to the thermal energy transfer discussed above. The hot water vapor is continually removed from the spent nuclear fuel pool 600 and reintroduced into the spent nuclear fuel pool 600 as cooled condensed water vapor. Thus, using the passive heat exchange sub-system 340, the spent nuclear fuel pool 600, and more specifically the body of liquid water 605 within the spent nuclear fuel pool 600, can be passively cooled by flowing the hot water vapor out of the spent nuclear fuel pool 600 and returning the cooled condensed water vapor back into the body of liquid water 605. The passive heat exchange sub-system 340 facilitates thermosiphon flow of the water vapor as discussed above without the use of any pumps or motors.

In certain embodiments, the air in the vapor space 611 can be partially evacuated (i.e., vacuumed) to a sub-atmospheric pressure so that the evaporation temperature of the body of liquid water 605 is lowered to between about 120° F. and 180° F., more specifically between about 135° F. and 165° F., and still more specifically to about 150° F. Evacuating the air in the vapor space 611 ensures that the vapor space remains filled with vapor water so that the thermosiphon flow of the water vapor through the passive heat exchange sub-system 340 can be achieved. Yet in certain other embodiments, the air in vapor space 611 may be at atmospheric or above atmospheric pressure.

Figures 8, 8A:
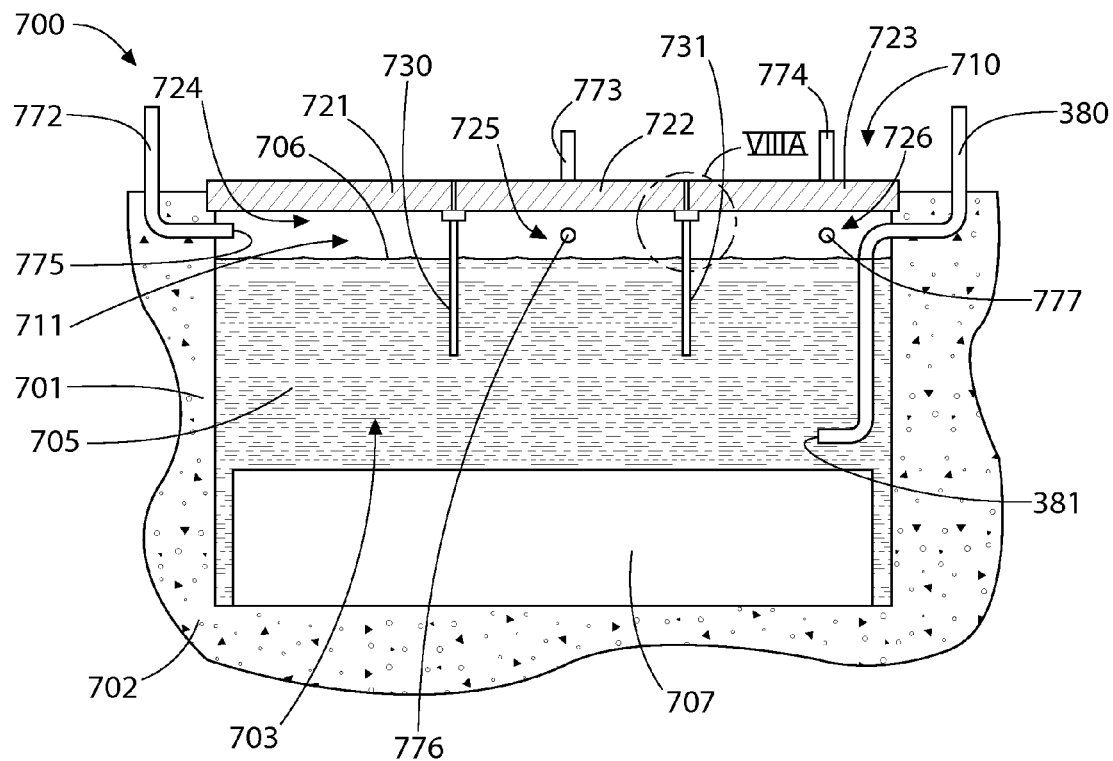
FIG. 8 is a schematic view of a cross-section of a spent nuclear fuel pool in accordance with an embodiment of the present invention.
FIG. 8A is a close-up view of area VIIIA of FIG. 8.
Figure 9:
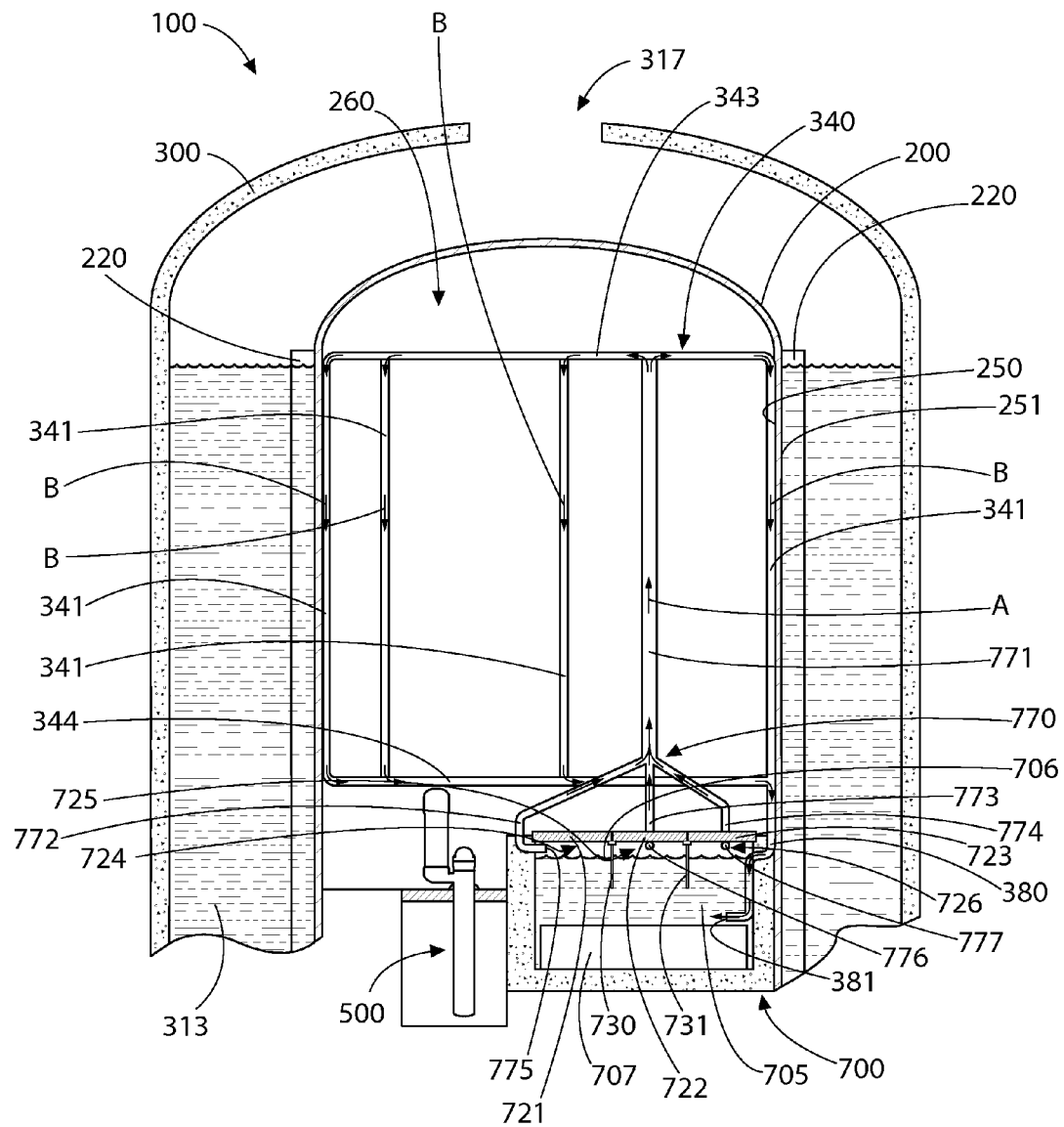
FIG. 9 is a schematic view of a generalized cross-section of a portion of a nuclear reactor containment enclosure and containment vessel in accordance with another embodiment of the present invention whereby the spent nuclear fuel pool of FIG. 8 is contained within the containment vessel.

Referring now to FIGS. 8 and 9, a spent nuclear fuel pool 700 will be described in accordance with another embodiment of the present invention. Certain features of the spent nuclear fuel pool 700 are similar to features described above with regard to the spent nuclear fuel pool 600. Those similar features will be similarly numbered except that the 700-series of numbers will be used.

The spent nuclear fuel pool 700 comprises a peripheral sidewall 701 and a floor 702 that collectively define an interior cavity 703. A body of liquid water 705 having a surface level 706 is positioned in the spent nuclear fuel pool 700 within the interior cavity 703. At least one spent nuclear fuel rod 707 is submerged in the body of liquid water 705. Because the spent nuclear fuel rod 707 is extremely hot, the spent nuclear fuel rod 707 heats the body of liquid water 705. Thus, the body of liquid water 705 is, in certain embodiments, continuously cooled to remove the heat produced by the spent nuclear fuel rod(s) 707 by using the passive heat exchange sub-system 340, as will be discussed in more detail below.

In the exemplified embodiment, a lid 710 covers the spent nuclear fuel pool 700 and forms a hermetically sealed vapor space 711 between the surface level 706 of the body of liquid water 705 and the lid 710. In the exemplified embodiment, the lid 710 comprises a first lid section 721, a second lid section 722 and a third lid section 723 that collectively cover the entire spent nuclear fuel pool 700. Although three different lid sections are illustrated in the exemplified embodiment, the invention is not to be so limited in all embodiments. Thus, the lid 710 may include only two lid sections or the lid 710 may include more than three lid sections in other embodiments. The number of lid sections in certain embodiments corresponds with the number of dividers as discussed below (there will be one more lid section than there are dividers in certain embodiments).

Furthermore, in the exemplified embodiment a first divider 730 extends from the lid 710 a partial distance into the body of liquid water 705 and a second divider 731 extends from the lid 710 a partial distance into the body of liquid water 705. Each of the dividers 730, 731 is a partial depth wall that extends a partial depth into the body of liquid water 705. The dividers 730, 731 can be formed of any desired material such as metal, metal alloys, concrete and the like. The first divider 730 extends from the lid 710 at a position between the first and second lid sections 721, 722 and into the body of liquid water 705 and the second divider 731 extends from the lid 710 at a position between the second and third lid sections 722, 723 and into the body of liquid water 705. The dividers 730, 731 may be directly coupled to the lid 710 in certain embodiments such as by welding, adhesive, fasteners or the like, or may be indirectly coupled to the lid 710 by intervening structures. Although two dividers are illustrated in the exemplified embodiment, the invention is not to be so limited. Thus, in certain other embodiments there may only be one divider, or there may be more than two dividers. In certain embodiments, if one divider is used, then the lid has two lid sections, if two dividers are used, then the lid has three lid sections, if three dividers are used, then the lid has four lid sections and so on.

Each of the first and second dividers 730, 731 extends from the lid 710 and into the body of liquid water 705, but not all the way to the floor of the spent nuclear fuel pool 700. In certain embodiments, each of the dividers 730, 731 extends to between approximately ⅓ and ⅕ of a depth of the body of liquid water 705, and more specifically to between approximately ¼ of a depth of the body of liquid water 705. Thus, if the spent nuclear fuel pool 700 has a depth of forty feet, each of the first and second dividers 730, 731 may extend to between 8 and 13 feet into the body of liquid water 705, or more specifically to approximately 10 feet into the body of liquid water 705. Of course, depths of extension of the first and second dividers 730, 731 can be greater or less than that noted above and the invention is not to be limited by the depth of extension of the dividers 730, 731 into the body of liquid water 705 unless specifically recited in the claims.

Because the first and second dividers 730, 731 only extend partially into the body of liquid water 705, the body of liquid water 705 is able to flow beneath the first and second dividers 730, 731. Thus, the entire body of liquid water 705 can flow freely within the spent nuclear fuel pool 700 without any restrictions. However, the first and second dividers 730, 731 divide the vapor space 711 into a first vapor space section 724 located between the first lid section 721 and the surface level 706 of the body of liquid water 705, a second vapor space section 725 located between the second lid section 722 and the surface level 706 of the body of liquid water 705, and a third vapor space section 726 located between the third lid section 723 and the surface level 706 of the body of liquid water 705. Each of the first, second and third vapor space sections 724, 725, 726 are hermetically isolated from one another by the dividers 730, 731 and by the lid sections 721, 722, 723 so that water vapor in the first vapor space section 724 cannot flow into the second or third vapor space sections 725, 726, water vapor in the second vapor space section 725 cannot flow into the first or third vapor space sections 724, 726, and water vapor in the third vapor space section 726 cannot flow into the first or second vapor space sections 724, 725.

In the exemplified embodiment, a gasket 735 is coupled to each of the first, second and third lid sections 721, 722, 723 (see FIG. 8A). The gasket 735 may be an annular rubber gasket or any other type of known gasket that facilitates the creation of the hermetically sealed vapor space sections 724, 725, 726. Thus, the spent fuel pool 700 is covered by a set of heavy lid sections 721, 722, 723 with peripheral seals so that the space (i.e., the vapor space sections 724, 725, 726 underneath the lid sections 721, 722, 723) is sequestered from the ambient environment above the lid sections 721, 722, 723.

In the exemplified embodiment, water vapor from each of the first, second and third vapor space sections 724, 725, 726 can be introduced into the passive heat exchange sub-assembly 340. In that regard, a riser pipe 770 (see FIG. 9) that carries the water vapor from the spent nuclear fuel pool 700 to the downcomer conduits 341 comprises a primary riser section 771 (see FIG. 9), a first riser inlet section 772, a second riser inlet section 773 and a third riser inlet section 774. In the exemplified embodiment, each of the first, second and third riser inlet sections 772, 773, 774 extends into and through the concrete peripheral sidewall 701 of the spent nuclear fuel pool 700. This arrangement enables each of the lid sections 721, 722, 723 to be removed/opened without affecting the intake/return piping of the passive heat exchange sub-system 340.

The first riser inlet section 772 has a first inlet 775 positioned within the first vapor space section 724, the second riser inlet section 773 has a second inlet 776 positioned within the second vapor space section 725, and the third riser inlet section 774 has a third inlet 777 positioned within the third vapor space section 726. Thus, each of the first, second and third inlets 775, 776, 777 is located above the surface level 706 (i.e., the maximum water surface) of the body of liquid water 705 within a respective one of the vapor space sections 724, 725, 726. The flow of the water vapor from each of the first, second and third vapor space sections 724, 725, 726 through the passive heat exchange sub-system 340 will be discussed in more detail below with reference to FIG. 9.

Furthermore, as discussed above the passive heat exchange sub-system 340 comprises a return conduit 380. In the exemplified embodiment, the return conduit 380 extends through the concrete sidewall 701 of the spent nuclear fuel pool 700. The return conduit 380 terminates at an outlet 381 that is located within the body of liquid water 705. Although only one return conduit 380 is illustrated in the exemplified embodiment, more than one return conduit 380 can be used in other embodiments, such as having one return conduit for each vapor space section.

In certain embodiments, the air in each of the first, second and third vapor space sections 724, 725, 726 can be partially evacuated to a sub-atmospheric pressure, such as by vacuuming the air out of the vapor spaces 724, 725, 726, so that the evaporation temperature of the body of liquid water 705 is lowered to between about 120° F. and 180° F., more specifically between about 135° F. and 165° F., and still more specifically to about 150° F. Evacuating the air in the vapor space sections 724, 725, 726 ensures that the vapor space sections 724, 725, 726 remain filled with vapor water so that the thermosiphon flow of the water vapor through the passive heat exchange sub-system 340 can be achieved. Yet in certain other embodiments, the air in vapor space 611 may be at atmospheric or above atmospheric pressure.

Using the inventive spent nuclear fuel pool 700, any one of the lid sections 721, 722, 723 can be separately removed from the spent nuclear fuel pool 700 as desired for installing or removing a new fuel cartridge or fuel assembly into the spent nuclear fuel pool 700. When it is desired to remove one of the lid sections 721, 722, 723, first the pressure within the particular vapor space section 724, 725, 726 that is covered by the lid section 721, 722, 723 to be removed is equalized to ambient. Then, the lid section 721, 722, 723 is removed. While one of the lid sections 721, 722, 723 is removed for fuel management activity, the other lid sections 721, 722, 723 will remain covering the spent nuclear fuel pool 700. Thus, if, for example without limitation, the first lid section 721 is removed, the second and third lid sections 722, 723 will remain in place. Thus, the second and third vapor space sections 725, 726 will continue to be hermetically sealed vapor spaces, and the second and third riser inlet sections 773, 774 will continue to receive water vapor from the second and third vapor space sections 725, 726 and flow the received water vapor through the passive heat exchange sub-system 340. Thus, in certain embodiments the pool cooling system will continue to work at all times, even during fuel management activity, unaided by any motors or pumps.

Referring solely to FIG. 9, flow of the water vapor through the passive heat exchange sub-system 340 when the passive heat exchange sub-system is fluidly coupled to the spent nuclear fuel pool 700 will be described. Because each of the first, second and third vapor space sections 724, 725, 726 are hermetically isolated from one another, an inlet 775, 776, 777 of one of the riser inlet sections 772, 773, 774 is positioned within a respective one of each of the first, second and third vapor space sections 724, 725, 726. In the exemplified embodiment, each of the first, second and third riser inlet sections 772, 773, 774 converge into the primary riser section 771 so that water vapor that flows through each of the first, second and third riser inlet sections 772, 773, 774 will converge in the primary riser section 771. The primary riser section 771 of the riser conduit 770 is fluidly coupled to the one or more downcomers 341 by the inlet conduit 343. More specifically, the primary riser section 771 of the riser conduit 770 is fluidly coupled to the inlet conduit 343, and the inlet conduit 343 is fluidly coupled to the downcomers 341.

Although in the exemplified embodiment the first, second and third riser inlet sections 772, 773, 774 converge into the primary riser section 771, the invention is not to be so limited in all embodiments. In certain other embodiments each of the first, second and third riser inlet sections 772, 773, 774 may extend separately from one of the vapor space sections 724, 725, 726 to the inlet conduit 343. Thus, the primary riser section 771 may be omitted and the first, second and third riser inlet sections 772, 773, 774 may not converge, but may instead each separately carry water vapor from the vapor space sections 724, 725, 726 to the inlet manifold 343 for dispersion into the downcomers 341.

Each of the primary riser section 771 and the first, second and third riser inlet sections 772, 773, 774 may include a thermal insulating layer to prevent thermal energy from leaving the water vapor while the water vapor is flowing within the riser conduit 770. Furthermore, each of the primary riser section 771 and the first, second and third riser inlet sections 772, 773, 774 may be spaced apart from the inner surface 250 of the containment vessel 200 to prevent the transfer of thermal energy from the water vapor to the heat sink while the water vapor is flowing within the riser conduit 770.

As noted above, the inlet manifold 343 is in fluid communication with the downcomers 341. Thus, the water vapor flows from the riser conduit 770 upwardly to the inlet manifold 343, where the water vapor then flows into the downcomers 341 and downwardly within the downcomers 341. As discussed above, in certain embodiments the downcomers 341 are in intimate surface contact or otherwise coupled to the inner surface 250 of the containment vessel 200. Thus, as the water vapor flows within the downcomers 341, thermal energy is transferred from the water vapor, through the downcomers 341, through the containment vessel 200 and into the heat sink (i.e., into the liquid reservoir within the head sink space 313). This thermal energy transfer cools and condenses the water vapor and turns the water vapor into a condensed water vapor.

The condensed water vapor then continues to flow downwardly through the downcomers 341 by gravity action. The condensed water vapor flows into the outlet manifold 344, and then from the outlet manifold 344 into the return conduit 380. From the return conduit 380, the condensed water vapor flows through the outlet 381 and into the body of liquid water 705. Thus, using the passive heat exchange sub-system 340, the body of liquid water 705 in the spent nuclear fuel pool 700 can be passively cooled by flowing heated vapor water out of the spent nuclear fuel pool 700 and flowing cooled condensed water vapor back into the spent nuclear fuel pool 700.

In certain embodiments, the present invention can be directed to a method of passively cooling a spent nuclear fuel pool using the components discussed herein above. The operation of the system has been discussed in detail above, and the method is achieved by the inventive system. Specifically, using the system components discussed above, the inventive system can passively cool a spent nuclear fuel pool, and thus the invention can be a method of passively cooling a spent nuclear fuel pool.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A passively-cooled spent nuclear fuel pool system comprising:
   a spent nuclear fuel pool comprising:
      a body of liquid water having a surface level, at least one spent nuclear fuel rod submerged in the body of liquid water that heats the body of liquid water;
      a lid covering the spent nuclear fuel pool to form a hermetically sealed vapor space between the surface level of the body of liquid water and the lid, the vapor space including a first vapor space section and a second vapor space section, the lid comprising a first lid section and a second lid section; and
   a passive heat exchange sub-system comprising:
      a riser conduit comprising a first riser inlet section having a first inlet positioned within the first vapor space section, a second riser inlet section having a second inlet positioned within the second vapor space section and a primary riser section, wherein the primary riser section receives water vapor from the first and second vapor space sections;
      at least one downcomer fluidly coupled to the primary riser section for receiving the water vapor from the primary riser section, the water vapor condensing within the at least one downcomer to form a condensed water vapor; and
      at least one return conduit fluidly coupled to the at least one downcomer, the at least one return conduit having an outlet located within the body of liquid water for returning the condensed water vapor to the body of liquid water.

2. The system according to claim 1 further comprising a containment vessel comprising a cylindrical shell having an inner surface defining an interior cavity, the spent nuclear fuel pool housed within the interior cavity of the containment vessel.

3. The system according to claim 2 further comprising a containment enclosure surrounding the containment vessel, a heat sink space formed between the containment vessel and the containment enclosure.

4. The system according to claim 3 wherein the heat sink space contains water, and wherein the at least one downcomer is coupled to the inner surface of the containment vessel such that thermal energy from the water vapor is transferred to the water in the heat sink space through the at least one downcomer conduit and the containment vessel.

5. The system according to claim 1 further comprising a plurality of the downcomer conduits arranged in a circumferentially spaced apart manner about the inner surface of the containment vessel, and wherein each of the plurality of downcomer conduits is in intimate surface contact with the inner surface of the containment vessel.

6. The system according to claim 1 wherein the riser conduit comprises a thermal insulating layer.

7. The system according to claim 1 wherein the condensed water vapor mixes with the body of liquid water within the spent nuclear fuel pool.

8. The system according to claim 1 further comprising a first divider extending from the lid a partial distance into the body of liquid water to divide the vapor space into the first vapor space section located between the first lid section and the body of liquid water and the second vapor space section located between the second lid section and the body of liquid water.

9. The system according to claim 8 wherein the first and second vapor space sections are hermetically isolated from one another by the first divider and the first and second lid sections so that the water vapor in the first vapor space section cannot flow into the second vapor space section and the water vapor in the second vapor space section cannot flow into the first vapor space section.

10. The system according to claim 1 wherein each of the first and second vapor space sections is a hermetically sealed space.

11. The system according to claim 1 further comprising a gasket coupled to each of the first and second lid sections to create the hermetically sealed vapor space.

12. The system according to claim 8 wherein the spent nuclear fuel pool further comprises:
   a third lid section; and
   a second divider extending from the lid a partial distance into the body of liquid water, the first and second dividers dividing the vapor space into the first vapor space section, the second vapor space section and a third vapor space section, the third vapor space section located between the third lid section and the body of liquid water.

13. The system according to claim 12 wherein the riser conduit further comprises a third riser inlet section having a third inlet positioned within the third vapor space section, the third riser inlet section extending from the primary riser section to the third vapor space section.

14. The system according to claim 1 wherein a peripheral wall of the spent nuclear fuel pool is formed of concrete, and wherein the first and second riser inlet sections extend through the concrete.

15. The system according to claim 1 wherein each of the first and second vapor space sections is at a sub-atmospheric pressure.

16. The system according to claim 1 wherein the passive heat exchange sub-system further comprises an inlet manifold fluidly coupling the riser conduit to the at least one downcomer conduit and an outlet manifold fluidly coupling the at least one downcomer conduit to the at least one return conduit.

17. The system according to claim 1 wherein the passive heat exchange sub-system comprises a closed-loop fluid circuit.

18. The system according to claim 1 further comprising:
a nuclear reactor; and
the nuclear reactor, the spent nuclear fuel pool and the passive heat exchange sub-system housed within a thermally conductive containment vessel, the at least one downcomer conduit coupled to the thermally conductive containment vessel such that thermal energy from the water vapor is transferred through the at least one downcomer conduit and the thermally conductive containment vessel to a heat sink.

19. A passively-cooled spent nuclear fuel pool system comprising:
a spent nuclear fuel pool comprising a body of liquid water having a surface level, at least one spent nuclear fuel rod submerged in the body of liquid water that heats the body of liquid water;
a lid covering the spent nuclear fuel pool to create a hermetically sealed vapor space between the surface level of the body of liquid water and the lid; and
a passive heat exchange sub-system fluidly coupled to the vapor space, the passive heat exchange sub-system configured to: (1) receive water vapor from the vapor space; (2) remove thermal energy from the received water vapor, thereby condensing the water vapor to form a condensed water vapor; and (3) return the condensed water vapor to the body of liquid water;
a heat sink;
wherein the passive heat exchange sub-system comprises at least one riser conduit receiving the water vapor from the vapor space and at least one downcomer conduit receiving the water vapor from the at least one riser conduit, the at least one downcomer conduit being in thermal cooperation with the heat sink to transfer thermal energy from the water vapor to the heat sink, thereby condensing the water vapor in the at least one downcomer conduit and facilitating thermosiphon flow of the water vapor through the passive heat exchange sub-system;
a thermally conductive containment vessel enclosing the spent nuclear fuel pool, the heat sink located outside of the thermally conductive containment vessel; and
the at least one downcomer conduit coupled to the thermally conductive containment vessel such that the thermal energy from the water vapor is transferred to the heat sink through the at least one downcomer conduit and the thermally conductive containment vessel.

20. The system according to claim 19 wherein the passive heat exchange sub-system comprises at least one inlet located in the vapor space and at least one outlet located in the body of liquid water.

21. The system according to claim 19 further comprising:
a containment enclosure at least partially surrounding the thermally conductive containment vessel to form a heat sink space therebetween; and
the heat sink being a liquid reservoir located within the heat sink space.

22. The system according to claim 21 wherein the heat sink space is an annular space circumferentially surrounding the thermally conductive containment vessel.

23. The system according to claim 21 wherein the containment enclosure has an open top end.

24. The system according to claim 21 further comprising a plurality of heat exchange fins extending from an outer surface of the thermally conductive containment vessel into the liquid reservoir.

* * * * *